(12) United States Patent
Sasse et al.

(10) Patent No.: US 10,371,054 B2
(45) Date of Patent: Aug. 6, 2019

(54) COOLING-AIR SUPPLY DEVICE FOR A GAS TURBINE

(71) Applicant: MTU Aero Engines AG, Munich (DE)

(72) Inventors: Stefan Sasse, Petershausen (DE); Erwin Bayer, Dachau (DE)

(73) Assignee: MTU Aero Engines AG, Munich (DE)

( * ) Notice: Subject to any disclaimer, the term of this patent is extended or adjusted under 35 U.S.C. 154(b) by 714 days.

(21) Appl. No.: 14/972,767

(22) Filed: Dec. 17, 2015

(65) Prior Publication Data
US 2016/0177831 A1 Jun. 23, 2016

(30) Foreign Application Priority Data

Dec. 17, 2014 (EP) ..................................... 14198658

(51) Int. Cl.
*F01D 5/08* (2006.01)
*F02C 7/18* (2006.01)
(Continued)

(52) U.S. Cl.
CPC ................. *F02C 7/18* (2013.01); *F01D 5/02* (2013.01); *F01D 5/082* (2013.01); *F01D 25/24* (2013.01); *F02C 3/04* (2013.01); *F05D 2220/3213* (2013.01); *F05D 2230/54* (2013.01); *F05D 2240/35* (2013.01); *F05D 2240/61* (2013.01);
(Continued)

(58) Field of Classification Search
CPC . F01D 5/082; F01D 5/02; F01D 25/24; F02C 7/18; F02C 3/04
See application file for complete search history.

(56) References Cited

U.S. PATENT DOCUMENTS 4,805,398 A 2/1989 Jourdain et al.
7,950,897 B2 * 5/2011 Kizuka .................. F01D 5/081
415/1
(Continued)

FOREIGN PATENT DOCUMENTS

EP 0266235 5/1998
GB 547204 8/1942
WO WO2014/052603 4/2014

*Primary Examiner* — Justin D Seabe
*Assistant Examiner* — Sabbir Hasan
(74) *Attorney, Agent, or Firm* — Davidson, Davidson & Kappel, LLC

(57) ABSTRACT

A cooling-air supply device for a gas turbine, in particular an aircraft gas turbine, including a cooling air chamber, that is disposed about a turbine shaft of the gas turbine, at least one cooling-air inlet opening, and at least one cooling-air outlet orifice; the cooling-air supply device having a first and a second axial bounding wall, and a peripheral wall that joins the two axial bounding walls, which, together, form the cooling air chamber; in at least one of the axial bounding walls, a plurality of cooling-air outlet orifices being provided, which are circumferentially distributed about the turbine shaft and are adapted to allow the cooling air to essentially be discharged from the individual cooling-air outlet orifices in the direction of rotation of the gas turbine. In the axial direction, the respective axial bounding wall having the cooling-air outlet orifices has a layer-type structure; the cooling-air outlet orifices being formed by deformation of at least one first cooling air chamber-side layer and by deformation of at least one second, turbine-side layer.

15 Claims, 3 Drawing Sheets

(51) Int. Cl.
*F01D 5/02* (2006.01)
*F01D 25/24* (2006.01)
*F02C 3/04* (2006.01)

(52) U.S. Cl.
CPC ...... *F05D 2260/14* (2013.01); *F05D 2260/20* (2013.01); *F05D 2260/201* (2013.01); *F05D 2300/6033* (2013.01); *F05D 2300/702* (2013.01); *Y02T 50/672* (2013.01); *Y02T 50/676* (2013.01)

(56) References Cited

U.S. PATENT DOCUMENTS

| | | | |
|---|---|---|---|
| 8,562,285 B2 * | 10/2013 | McCaffrey | F01D 5/081 415/115 |
| 9,175,566 B2 * | 11/2015 | Xu | G06F 9/44589 |
| 2014/0086727 A1 | 3/2014 | Xu | |

\* cited by examiner

COOLING-AIR SUPPLY DEVICE FOR A GAS TURBINE

This claims the benefit of European Patent Application EP14198658.8, filed Dec. 17, 2014 and hereby incorporated by reference herein.

The present invention relates to a cooling-air supply device for a gas turbine, in particular an aircraft gas turbine, including a cooling air chamber, that is disposed about a turbine shaft of the gas turbine, at least one cooling-air inlet orifice and at least one cooling-air outlet orifice, the cooling-air supply device having a first and a second axial bounding wall, and a peripheral wall that joins the two axial bounding walls, which, together, form the cooling air chamber; in at least one of the axial bounding walls, a plurality of cooling-air outlet orifices being provided, which are circumferentially distributed about the turbine shaft and are adapted to allow the cooling air to essentially be discharged from the individual cooling-air outlet orifices in the direction of rotation of the gas turbine.

BACKGROUND

When cooling air is supplied to cool rotating components, such as turbine blades and the like, it is preferably fed, respectively blown with pre-swirl in the direction of rotation to a component to be cooled in order to reduce efficiency losses caused by flow turbulences. These types of known cooling-air supply devices are used as part of an intermediate turbine housing, for example, the axial bounding walls being in the form of cast or forged parts in which obliquely extending cooling air bores are provided as cooling-air outlet orifices.

It is complex and, therefore, costly to manufacture such a design that includes turned forged parts or cast parts having the respective cooling air bores. Certain wall thicknesses are necessitated by a ratio to be realized between the diameter and the length of the cooling air bores, so that such cast, respectively forged parts are high in weight. In particular, the wall thickness must also be dimensioned to allow the introduced cooling air bores to maintain the overall stability of the bounding wall for the desired range of application in a gas turbine.

SUMMARY OF THE INVENTION

It is an object of the present invention to improve a cooling-air supply device in a way that makes it possible to reduce or avoid the above disadvantages.

The present invention provides that the respective axial bounding wall having the cooling-air outlet orifices has a layer-type structure in the axial direction, the cooling-air outlet orifices being formed by deformation of at least one first cooling air chamber-side layer and by deformation of at least one second, turbine-side layer.

A simpler manufacturing is achieved by the layer-type structure and by providing reshaped regions in the layers for forming the cooling-air outlet orifices. The desired deformations in the material layers may be achieved, for instance, by performing bending and/or stamping operations on a type of plate-type material layer. In a broader sense of the conventional meaning of forming by deformation, it is also conceivable here that a material layer already be provided during the manufacture thereof with such reshaped regions, for instance by the placement of such a material layer on an appropriately formed die. The deformations provided in the material layers also cause stiffening of the layer, in particular of plate-type substructures out of which the layers may be produced, so that, by using a plurality of layers having deformations provided therein, it is possible to produce a stable bounding wall that is material-saving and weight-reducing in comparison to known forged or cast parts.

The cooling-air outlet orifices are preferably formed by deformation of the first and the second layer in axially mutually opposing regions. In the process, the deformations may be configured to complement one another, in particular. The deformations in the layers complement one another in a way that allows the desired cooling-air outlet orifices to be formed by placing the layers against each other. In the case of two layers, the deformations may also be symmetrical, respectively have a substantially identical design, so that each deformation of the two layers essentially forms half of the cross section of a cooling-air outlet orifice to be created. Thus, the axially mutually opposing deformations of the layers make possible a simple and variable design of cooling-air outlet orifices, taking into account the desired ratios between diameter and length of the orifices.

It is also provided that the deformations be configured to form cooling air channels by placing the at least one first layer and the at least one second layer against each other. These cooling air channels establish a fluid communication between the cooling air chamber and the ambient environment of the cooling-air supply device. In particular, the cross sectional geometry of the cooling air channels may hereby be variably determined and adapted. The desired ratios between the diameter and the length of a relevant cooling air channel may be thereby considered.

It is preferred that the deformations be configured in a bead-like manner, each having an angular or curved, in particular arcuate geometry in cross section.

The bead-like deformations may have a top chord that extends obliquely relative to the particular first or/and second layer.

In addition, the bead-like deformations may have an unattached end that is separated from the respective layer. An unattached end of a bead-like deformation may be separated by a stamping or cutting operation that is performed during the deformation process.

Bead-like deformations of the first and second layer, that are configured to mutually oppose one another, may bound an obliquely extending cooling air channel, whose cooling chamber-side opening and whose turbine-side opening are formed by at least one unattached end of the bead-like deformations.

It is preferred that the respective axial bounding wall having the cooling-air outlet orifices be formed from at least two mutually joined metal sheets, each of the metal sheets constituting a layer. With reference to the possible embodiments already explained above, the bead-like deformations may be introduced into the metal sheets, and, subsequently thereto, the two reshaped metal sheets may be joined together in a way that allows the axially mutually opposing deformations to form the desired cooling-air outlet orifices, respectively cooling air channels.

It is alternatively provided that the respective axial bounding wall having the cooling-air outlet orifices be formed from at least two joined together layers of ceramic fiber composite materials in which corresponding deformations are configured to form the cooling-air outlet orifices. The reshaped regions are thereby already taken into consideration during manufacture of the material layers, and the ceramic fiber composite material is provided with corresponding shapes, making it possible for the desired material layer, together with the reshaped regions, to be prepared once the material is cured.

The present invention also relates to a gas turbine, in particular an aircraft gas turbine, including a compressor device, a combustion chamber, and a turbine, characterized in that a cooling-air supply device having at least one of the features mentioned above is provided in the area of the turbine.

To this end, it is also provided that the turbine have a high-pressure turbine and a low-pressure turbine, the cooling-air supply device being part of an intermediate turbine housing of the gas turbine.

The, respectively an axial bounding wall of the cooling-air supply device featuring the cooling-air outlet orifices may be disposed toward the high-pressure turbine or/and toward the low-pressure turbine.

BRIEF DESCRIPTION OF THE DRAWINGS

The present invention will be explained exemplarily in greater detail in the following with reference to the enclosed figures without being limited thereto.

In a greatly simplified schematic overview.

In subfigures a) through c)

In subfigures a) and b)

In a greatly simplified view.

DETAILED DESCRIPTION OF THE DRAWINGS

Figure 1:
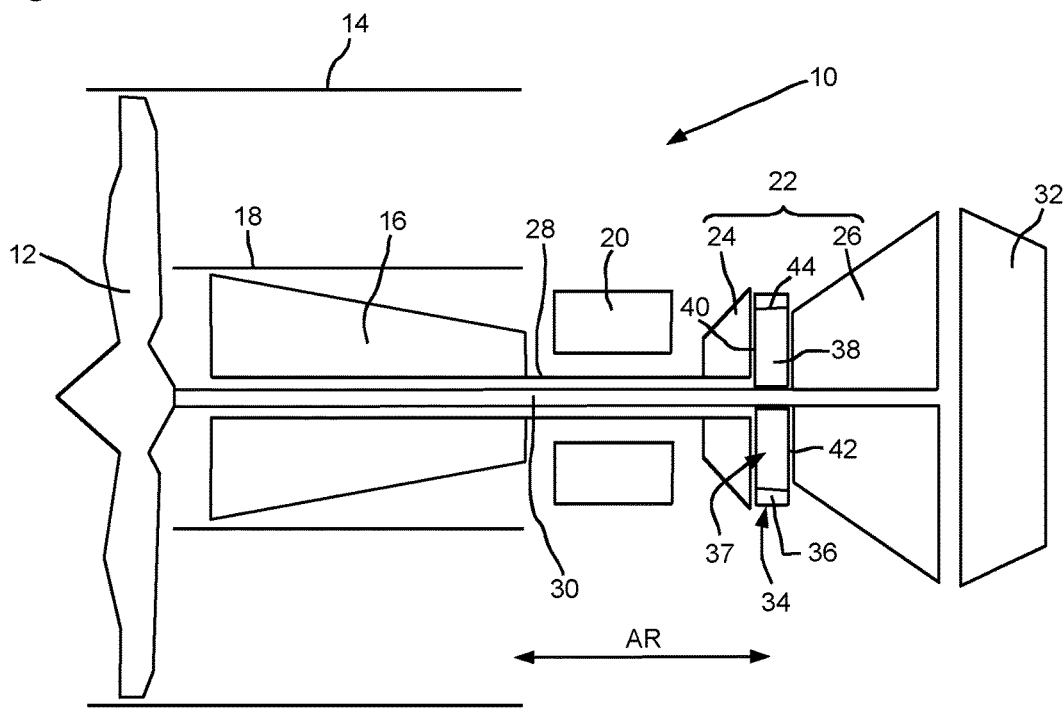
FIG. 1 shows a gas turbine, a possible configuration of a cooling-air supply device being illustrated.

In a greatly simplified and schematic view, FIG. 1 shows the design of a gas turbine 10, in particular of a gas-turbine aircraft engine (turbofan engine). Gas turbine 10 includes a fan 12 that is surrounded by a schematically indicated casing 14. Disposed downstream of fan 12 in an axial direction AR is a compressor 16 that is accommodated in a schematically indicated inner housing 18 and may have a single-stage or multi-stage design. Disposed downstream of compressors 16 is combustion chamber 20. Hot exhaust gas discharging from the combustion chamber then flows through subsequent single-stage or multi-stage turbine 22. In the present example, turbine 22 encompasses a high-pressure turbine 24 and a low-pressure turbine 26. A hollow shaft 28 connects high-pressure turbine 24 to compressor 16, in particular a high-pressure compressor, so that they are jointly driven, respectively rotated. Another interior shaft 30 connects low-pressure turbine 26 to fan 12 and, in some instances, to a low-pressure compressor, so that they are jointly driven, respectively rotated. Disposed downstream of turbine 22 is a thrust nozzle 32.

In the illustrated example, an intermediate turbine housing 34 is configured between high-pressure turbine 24 and low-pressure turbine 26 and is disposed about shafts 28, 30. In radially outer region 36 thereof, intermediate turbine housing is traversed by the flow of hot exhaust gases from high-pressure turbine 24. In a radially inner region, a cooling-air supply device 37 is provided with a cooling air chamber 38. In axial direction AR toward the high-pressure turbine, cooling air chamber 38 is bounded by a bounding wall 40 that may also be referred to as the partition wall of intermediate turbine housing 34. Toward low-pressure turbine 26, cooling air chamber 38 is separated by another axial bounding wall 42. The two axial bounding walls 40, 42 are mutually joined by a peripheral wall 44.

Figure 2:
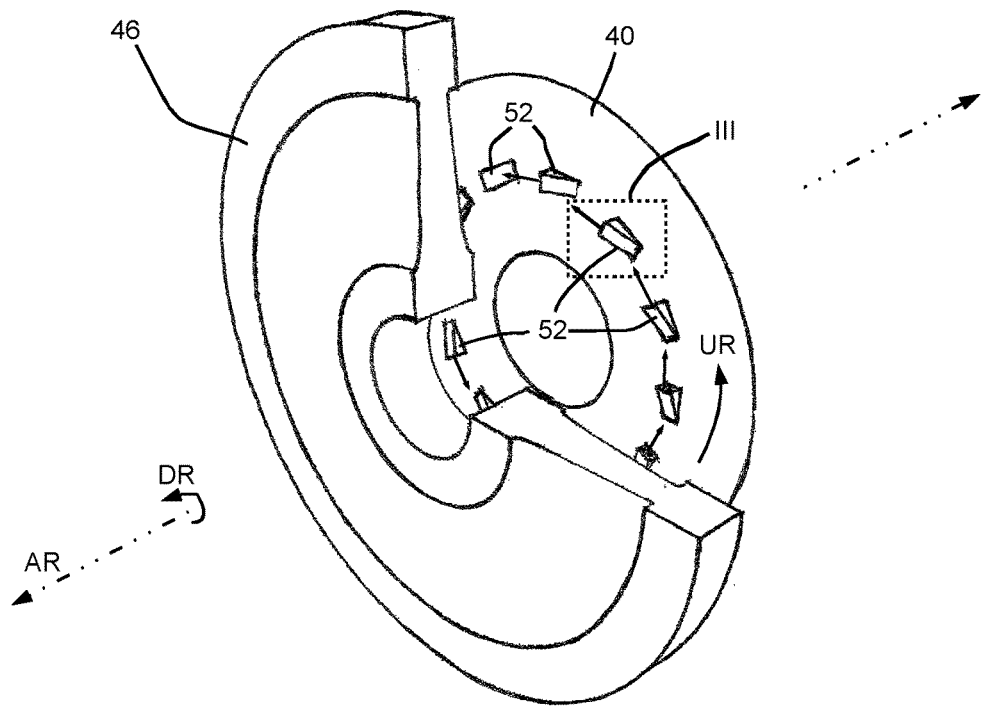
FIG. 2 shows a schematic, simplified perspective view of a turbine disk and of an axial bounding wall of a cooling-air supply device.

A turbine disk 46 is illustrated in a simplified form in FIG. 2. Such a turbine disk 46 may be associated with high-pressure turbine 24 or low-pressure turbine 26 or also with an intermediate-pressure turbine (not shown here). Disposed downstream of turbine disk 46 in an axial direction AR is schematically illustrated bounding wall 40 of cooling-air supply device 37, respectively of cooling air chamber 38.

Readily apparent in circumferential direction UR in bounding wall (partition wall) 40 are a plurality of distributed cooling-air outlet orifices, respectively cooling air nozzles 52. The purpose of these outlet orifices 52 is to allow cooling air to be supplied with a pre-swirl in direction of rotation DR of turbine 22, here exemplarily of high-pressure turbine 24 (small arrows), in particular to cool components of turbine 22, such as turbine blades and the like, by air. Cooling-air outlet orifices 52 may also be referred to as what is commonly known as pre-swirl nozzles.

Bounding wall 40 may be constituted of a layer-type structure, where cooling-air outlet orifices 52 are formed by reshaped regions of material layers, which will be explained in the following.

Figure 3:
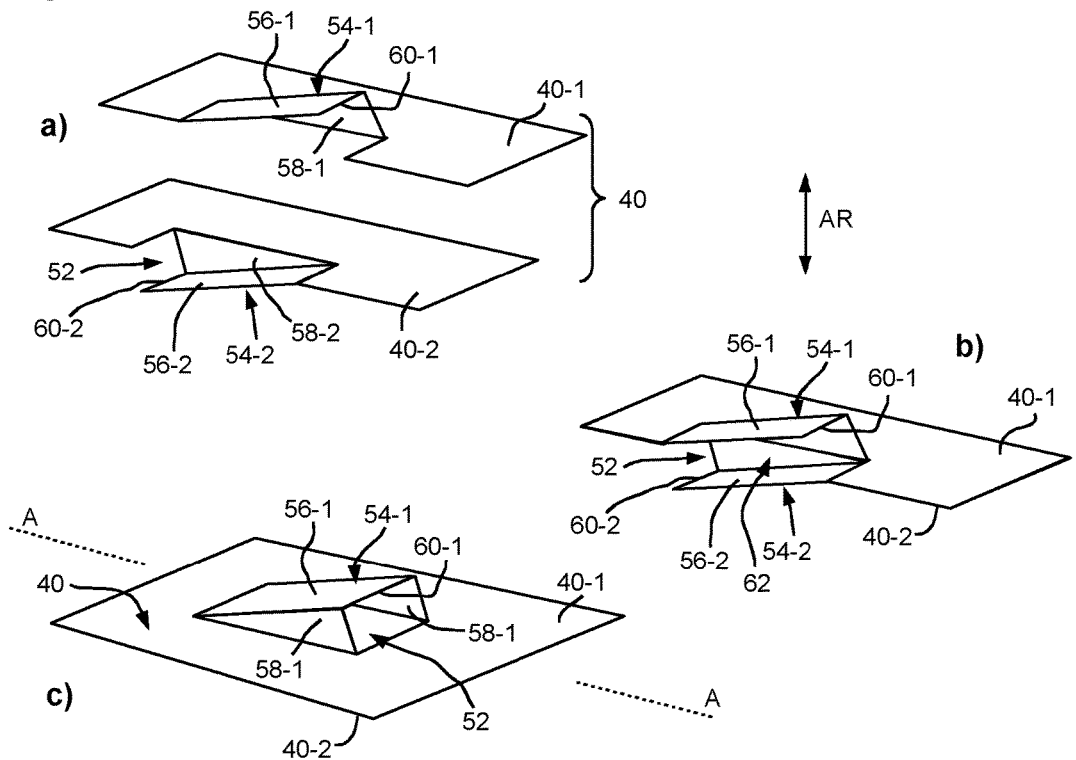
FIG. 3 shows a simplified, schematic specific embodiment of cooling-air outlet orifices, respectively of cooling air channels having an angular cross sectional geometry provided by two material layers.

FIG. 3 shows a schematic and enlarged representation of one possible embodiment of a cooling-air outlet orifice 52 that may correspond exemplarily to a region outlined in FIG. 2 by a dotted line rectangle III, however, in a somewhat differently selected perspective view. In the present example, axial bounding wall 40 may be formed by two layers 40-1 and 40-2. These layers may be realized as metal sheets. In the present example, layer 40-1 is understood to be facing cooling air chamber 38, and layer 40-2 as facing turbine 22, respectively high-pressure turbine 24. To form cooling-air outlet orifices 52, layers, respectively sheet metal panels 40-1 and 40-2 are deformed, for instance by stamping and/or bending operations, thereby allowing bead-like deformations 54-1 and 54-2 to be formed. FIG. 3a) shows the two layers 40-1 and 40-2 as being separate from one another and cut in the longitudinal direction of deformations 54-1 and 54-2, approximately in conformance with line of intersection A-A of FIG. 3c). Bead-like deformation 54-1 shown in FIG. 3c) features what is generally referred to as a top chord 56-1 that is joined by respective sides 58-1 to layer, respectively sheet metal panel 40-1. Top chord 56-1 extends obliquely to layer 40-1, so that, in the present example, bead-like deformation 54-1 is configured to be a type of wedge. At 60-1, deformation 54-1 has an unattached end that has been separated from layer 40-1. The aforementioned concerning layer, respectively sheet metal panel 40-1 applies analogously to second layer, respectively sheet metal panel 40-2, which likewise has a top chord 56-2, sides 58-2 and an unattached end 60-2. The two deformations 54-1 and 54-2 are configured to complement one another (FIG. 3b) upon joining together of the two layers, respectively sheet metal panels 40-1 and 40-2, in order to form a cooling-air outlet orifice 52 in bounding wall 40. Deformations 54-1 and 54-2 also delimit a cooling air channel 62 that crosses bounding wall 40 obliquely, respectively diagonally.

Figure 4:
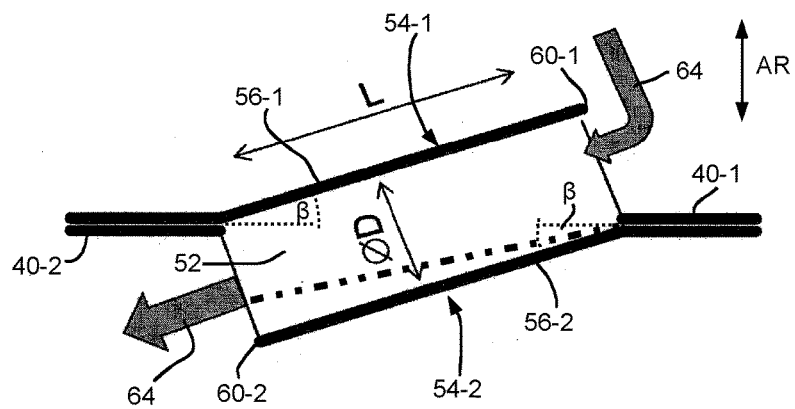
FIG. 4 shows a simplified, cross-sectional view through a cooling air channel that is formed from two material layers.

In a sectional representation, FIG. 4 shows a cooling-air outlet orifice 52 having cooling air channel 62. Layer, respectively sheet metal panel 40-1 faces cooling air chamber. As indicated by black arrows 64, the pressurized cooling air in the cooling air chamber escapes through cooling-air outlet orifice 52 toward the turbine to allow cooling air to flow around and cool the desired components. Readily apparent again in the illustration of FIG. 4 are top chords 56-1 and 56-2, as well as unattached ends 60-1 and 60-2 of the two bead-like deformations 54-1 and 54-2. Also apparent from the illustration is that a desired ratio between the length and the diameter of cooling air channel 62 is attainable by properly selecting the length of top chord 56-1, respectively 56-2, as well as the dimensions of the deformation of layers 40-1 and 40-2. For example, the diameter of cooling air channel 62 is reduced by selecting a smaller angle of inclination $\beta$ of top chords 56-1 and 56-2. It is noted that the angle of inclination of top chords 56-1, respectively 56-2 may be the same or different. If, in the present example of FIG. 4, angle of inclination $\beta$ of turbine-side top chord 56-2 is reduced, for instance, a flow cross section of channel 62 is attainable that is tapered in the direction of flow, as is indicated by the wide dash-dot line.

Figure 5:
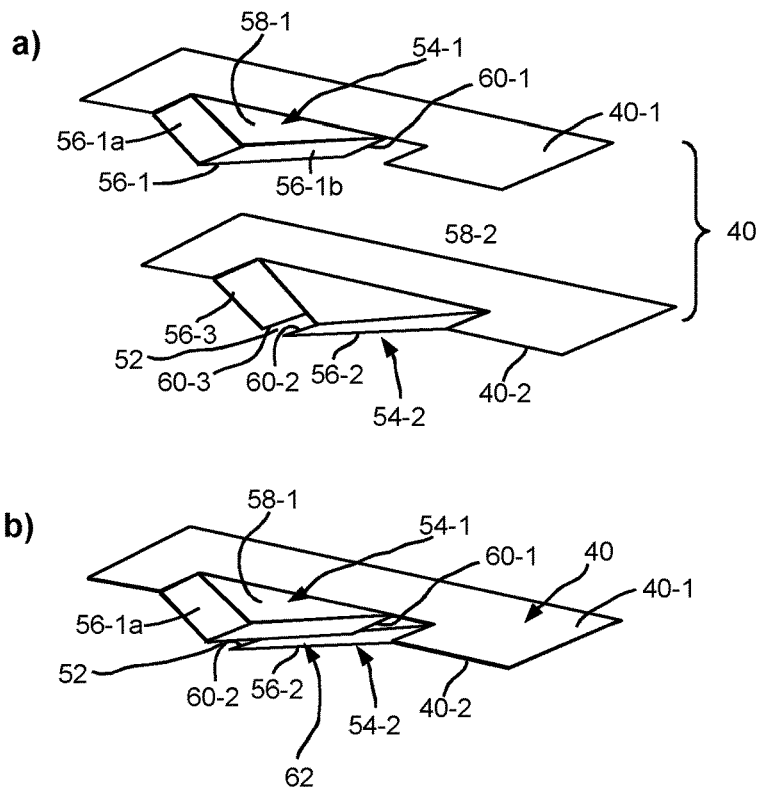
FIG. 5 shows another simplified, schematic specific embodiment of cooling-air outlet orifices, respectively of cooling air channels.

FIG. 5 shows another specific embodiment of reshaped regions 54-1 and 54-2. While deformations 54-1 and 54-2 are configured to be substantially identical and symmetrical in FIG. 3, deformations 54-1 and 54-2 of FIG. 5 are differently configured, making it possible for a different flow configuration and cross section of cooling air channel 62 to be achieved. In this example, top chord 56-1 of bead-like deformation 54-1 is formed by two surfaces 56-1a and 56-1b that extend obliquely relative to each other. At surface 56-1b, top chord 56-1b features unattached end 60-1 thereof. In contrast to the example of FIG. 3, relative to layer, respectively sheet metal panel 40-1, top chord 56-1 extends in such a way that it does not project over layer, respectively sheet metal panel 40-1 in the direction of cooling air chamber. Bead-like deformation 54-2 has two top chords 56-2 and 56-3 that are configured to extend obliquely relative to each other; respective ends 60-2 and 60-3 thereof opposing one another, leaving a free space therebetween. If the two layers, respectively sheet metal panels 40-1 and 40-2 of FIG. 5a) are placed one over the other and bonded together, as shown in FIG. 5b), a narrow cooling air channel 62 is formed that is bounded by top chords 56-1 and 56-2, as well as by corresponding side walls, of which only that having reference numeral 58-1 is visible. Cooling air from cooling air chamber flows out at 52.

Figure 6:
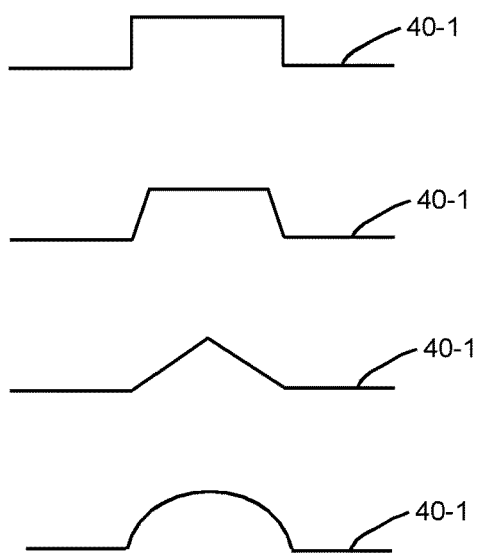
FIG. 6 shows schematically possible cross-sectional shapes of a bead-like embodiment of cooling-air outlet orifices, respectively cooling air channels.

For the sake of simplicity, the two examples of FIGS. 3 and 5 only show cross sectional geometries of bead-like deformations 54-1 and 54-2 that form an angular, in particular rectangular flow cross section. However, the embodiment and the geometries of the bead-like deformations may also have other shapes, as is shown exemplarily in FIG. 6. A bead-like deformation in one of layers 40-1, respectively 40-2 may also have a trapezoidal, triangular or arcuate shape. The embodiment of the bead-like deformations may, therefore, be selected and adapted as needed. It is also conceivable that the deformations differ in two mutually joined layers, respectively sheet metal panels.

Generally speaking, the reshaped regions of the layers may be provided at corresponding positions in each particular case when a bounding wall of the cooling air chamber is manufactured, and the embodiment may be selected in a way that forms the corresponding cooling-air outlet orifices, respectively cooling air channels when the layers are placed against each other.

Layers, respectively sheet metal panels 40-1 and 40-2 to be joined to one another may be bonded, soldered or welded.

Even if layers 40-1 and 40-2 have been described as metal sheets in the specified examples, these layers may also be made of other materials and have the appropriate form design in order to form the cooling-air outlet orifices. In particular, it is envisaged here to manufacture layers 40-1 and 40-2 of ceramic fiber composite material. A layer referred to here as a first, respectively second layer may itself be made of a plurality of layers of such ceramic fiber composite material.

The layer-type structure presented here of axial bounding walls of the cooling air chamber makes possible a material-saving and cost-effective alternative to cast or forged parts in which bores are provided as cooling-air outlet orifices. In addition, the geometry of the cooling-air outlet orifices, respectively of the cooling air channels may be more freely configured in comparison to bores. In particular, it is also conceivable to undertake additional small-volume deformations at unattached ends of the top chords of the bead-like deformations to counteract turbulences at the unattached ends, for example.

What is claimed is:

1. A cooling-air supply device for a gas turbine comprising:
    a cooling air chamber disposed about a turbine shaft of the gas turbine;
    at least one cooling-air inlet opening and a plurality of cooling-air outlet orifices;
    the cooling-air supply device having a first and a second axial bounding wall, and a peripheral wall joining the first and second axial bounding walls, together, forming the cooling air chamber; at least one of the first and second axial bounding walls having the plurality of cooling-air outlet orifices circumferentially distributed about the turbine shaft and adapted to allow cooling air to be discharged from the plurality of cooling-air outlet orifices in a direction of rotation of the gas turbine,
    wherein, in the axial direction, the at least one of the first and second axial bounding walls having the plurality of cooling-air outlet orifices having a layer structure; the plurality of cooling-air outlet orifices being formed by deformation of at least one first cooling air chamber-side layer and by deformation of at least one second, turbine-side layer.

2. The cooling-air supply device as recited in claim 1 wherein the plurality of cooling-air outlet orifices are formed by deformation of the at least one first cooling-air side layer and the at least one second, turbine-side layer in axially mutually opposing regions.

3. The cooling-air supply device as recited in claim 2 wherein the deformations are configured to complement one another.

4. The cooling-air supply device as recited in claim 2 wherein the deformations are designed in a way that forms cooling air channels by placing the at least one first cooling-air side layer and the at least one second, turbine-side layer against each other to establish a fluid communication between the cooling air chamber and an ambient environment of the cooling-air supply device.

5. The cooling-air supply device as recited in claim 1 wherein the deformations are in a bead form, each being angular or curved.

6. The cooling-air supply device as recited in claim 5 wherein the deformations each have an arcuate geometry in cross section.

7. The cooling-air supply device as recited in claim 5 wherein the bead deformations have a top chord extending obliquely relative to a respective one of the at least one first cooling-air side layer or the at least one second, turbine-side layer.

8. The cooling-air supply device as recited in claim 5 wherein the bead deformations have an unattached end separated from a respective one of the at least one first cooling-air side layer or the at least one second, turbine-side layer.

9. The cooling-air supply device as recited in claim 5 wherein bead deformations of the at least one first cooling-air side layer and the at least one second, turbine-side layer, the at least one first cooling-air side layer and the at least one second, turbine-side configured to mutually oppose one another, delimit an obliquely extending cooling air channel, having a cooling chamber-side opening and having a turbine-side opening formed by at least one unattached end of the bead deformations.

10. The cooling-air supply device as recited in claim 1 wherein the first or second axial bounding wall having the plurality of cooling-air outlet orifices has at least two mutually joined metal sheets, each of the metal sheets forming a layer.

11. The cooling-air supply device as recited in claim 1 wherein the first or second axial bounding wall having the plurality of cooling-air outlet orifices is formed from at least two joined together layers of ceramic fiber composite materials in which corresponding deformations are configured to form the plurality of cooling-air outlet orifices.

12. A gas turbine comprising:
a compressor device;
a combustion chamber; and
a turbine, wherein, in the area of the turbine, the gas turbine has a cooling-air supply device as recited in claim 1.

13. The gas turbine as recited in claim 12 wherein the turbine has a high-pressure turbine and a low-pressure turbine, the cooling-air supply device being part of an intermediate turbine housing of the gas turbine.

14. The gas turbine as recited in claim 13 wherein the first or second axial bounding wall of the cooling-air supply device having the plurality of cooling-air outlet orifices is disposed toward the high-pressure turbine or toward the low-pressure turbine.

15. An aircraft gas turbine comprising the gas turbine as recited in claim 12.

* * * * *